C. E. DERR.
GEAR CUTTING MACHINE.
APPLICATION FILED AUG. 7, 1916.
1,290,929.
Patented Jan. 14, 1919.
3 SHEETS—SHEET 1.
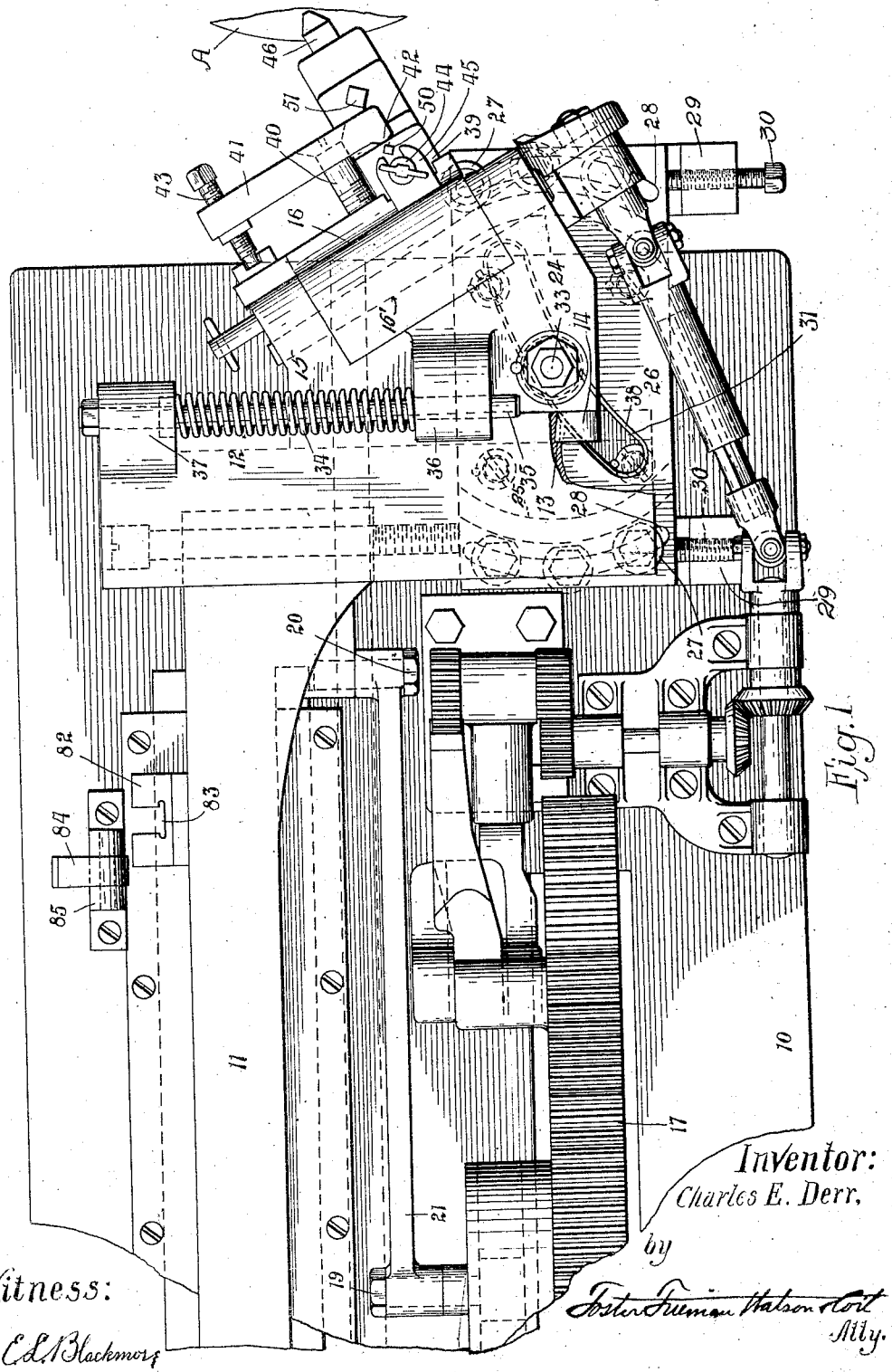
Inventor:
Charles E. Derr,
by
Foster Freeman Watson Coit
Atty.
Witness:
J. E. N. Blackmore

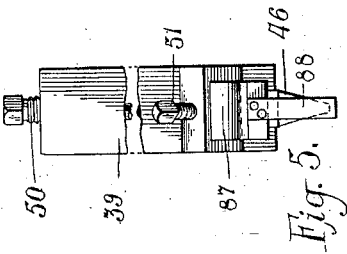
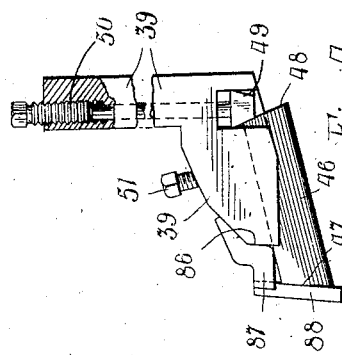
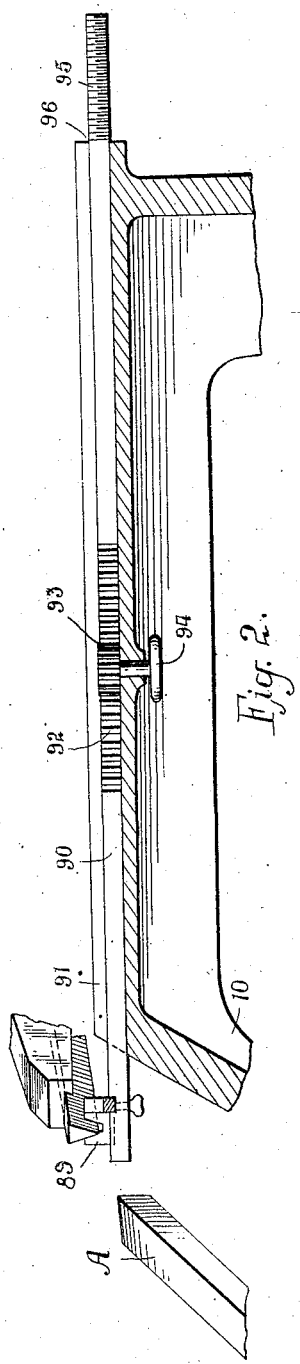
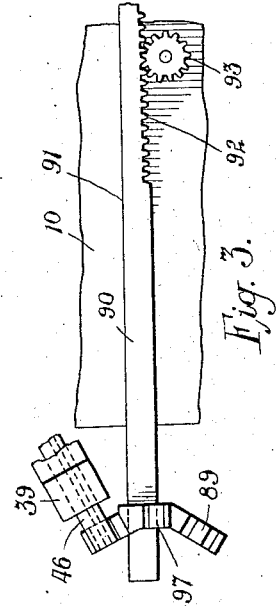

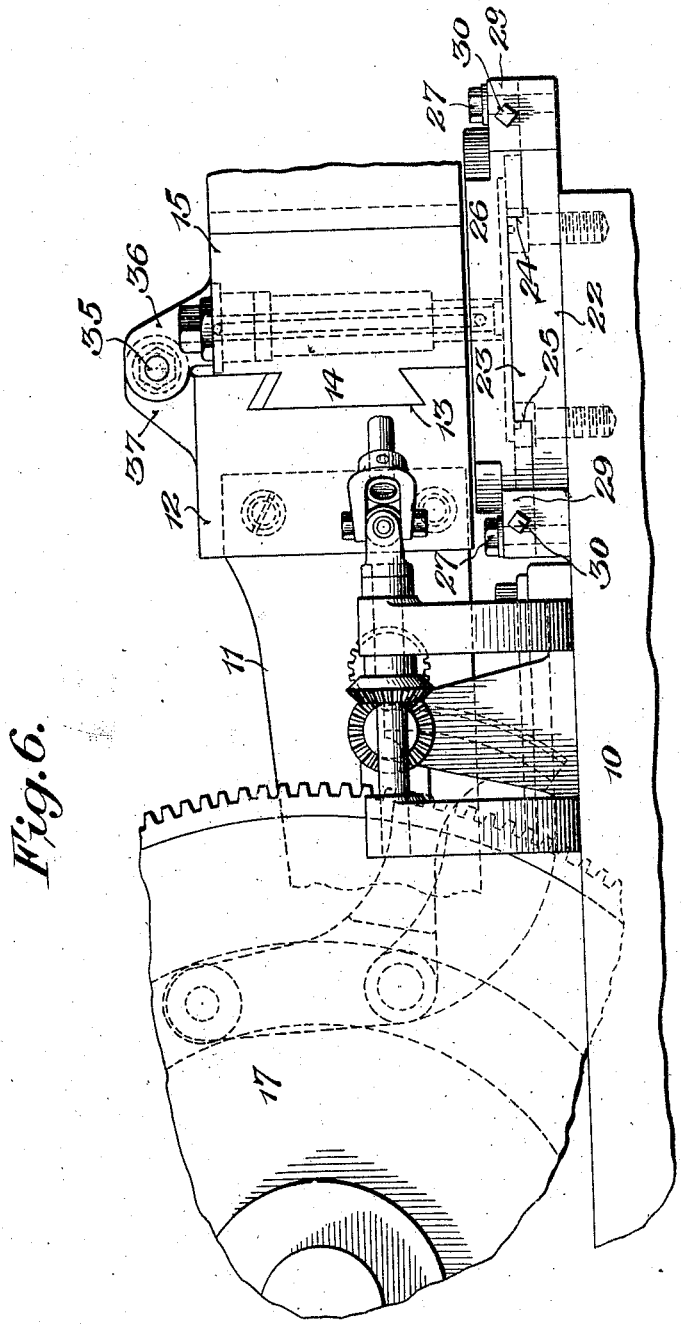

UNITED STATES PATENT OFFICE.

CHARLES E. DERR, OF DETROIT, MICHIGAN.

GEAR-CUTTING MACHINE.

1,290,929.  Specification of Letters Patent.  Patented Jan. 14, 1919.

Original application filed February 11, 1913, Serial No. 747,677. Divided and this application filed August 7, 1916. Serial No. 113,645.

*To all whom it may concern:*

Be it known that I, CHARLES E. DERR, a citizen of the United States, and resident of Detroit, Wayne county, State of Michigan, have invented certain new and useful Improvements in Gear-Cutting Machines, of which the following is a specification.

This application is a division of copending application Serial No. 747,677, filed February 11, 1913, and relates to gear cutting machines, particularly to improvements in means for positioning the gear cutting tool.

One object of the invention is to provide improved means for minutely adjusting the position of the tool in the tool holder.

A further object is to provide an improved set of gages whereby the tool may be readily set in its proper position.

Other objects and the features of novelty will be apparent from the following description, taken in connection with the accompanying drawings, in which:

Figure 1 is a plan view of a portion of a gear cutting machine and showing my improvements;

Fig. 2 is a longitudinal section through the machine, and showing in elevation one of my improved gages;

Fig. 3 is a plan view of the parts shown in Fig. 2;

Fig. 4 is a side elevation of the tool holder with another of the gages shown in position for setting the tool;

Fig. 5 is a front elevation of the parts shown in Fig. 4; and

Fig. 6 is a side elevation of the parts shown in Fig. 1.

Referring to the drawings, 10 indicates the frame of the machine on which is slidably mounted the ram 11 having secured thereto the head 12. The head 12 is provided with a suitable dove-tail slot 13 in its front face in which is arranged the dovetail 14 of the tool carriage 15. The carriage 15 has pivoted thereto the tool supporting apron 16, the pivot 16' being arranged at an angle to the direction of movement of the ram 11 (see Fig. 1) and substantially at right angles to the direction of movement of the tool.

As in the case of my prior application, Serial No. 725,328, filed October 11, 1912, this machine is especially adapted for cutting bevel gears having spiral or curved teeth and the curvature of the teeth is formed by combining with the usual reciprocating movement of the ram and tool carriage, a transverse movement of the carriage. The ram and the tool carriage may be reciprocated in any suitable manner and for this purpose I have provided a gear wheel 17 driven from any suitable source of power. The wheel 17 carries an adjustably arranged crank pin 19 which is connected with a pin 20 on the ram 11 by means of connecting rod 21. In order to move the tool carriage laterally a plate 22 may be secured to the frame 10 beneath the carriage and having a raised central portion 23 provided with the circular edges 24 and 25, this raised portion thus constituting a pivot for a plate 26 which is secured on the plate 22 by means of suitable bolts 27 passing through slots 28 in the plate 26. The plate 26 as thus arranged constitutes a form of turn table. In order to hold the plate 26 in any desired position, the plate 22 is provided with the lugs 29 through which pass the adjusting screws 30, these screws engaging one of the edges of the plate 26 so that by turning these screws in opposite directions it is possible to swing the plate 26 on the raised portion 23 of the plate 22. The plate 26 is provided with a suitably formed cam slot 31 in which moves the cam roller 32 carried by the pin or bolt 33 on the tool carriage 15. The parts just described constitute means for adjusting the tool laterally.

From Fig. 1 it will be obvious that as the ram 11 is reciprocated the tool carriage will be moved laterally by the engagement of the roller with the edges of the cam slot 31. In order to prevent back lash of the roller in the slot 31 and maintain the roller in yieldable contact with one side of the slot I have provided a comparatively stiff spring 34 which is arranged on a bolt or pin 35 between the brackets 36 and 37. The bracket 36 is secured to the tool carriage 15 and the bracket 37 is secured to the head 12 of the ram 11. The bolt or pin 35 is preferably secured in the bracket 37 and slides freely through a suitable opening in the bracket 36 so that as the ram reciprocates the spring 34 will be alternately contracted and extended and will maintain the roller in yieldable contact with the side 38 of the cam slot 31.

The tool apron 16 has arranged on its front face the tool holder 39, this holder being held in position by means of a clamping plate 41, which is fulcrumed on the screw 40 and has its side 42 forced into engagement with the tool holder, to secure the latter, by means of a screw 43. The tool holder 39 may be adjusted vertically by means of a screw 44 which is held in a bracket 45 on the apron 16. The tool holder is provided with a dovetail slot in its lower side which receives the wedge shaped tool 46, the cutting edge 47 of which is arranged at the forward end of the tool. The rearward end 48 of the tool 46 is beveled and has arranged in engagement therewith a wedge 49 which may be adjusted vertically by means of a screw 50 for the purpose of moving the tool forwardly. The tool may be clamped in any desired position by means of a set screw 51.

In order to cut the teeth accurately in the blank A it is necessary that the forward edge of the tool be accurately set in a certain position because the tool must engage the blank at the proper point in its lateral movement otherwise the tooth space would be displaced laterally from the required position. For this purpose I have provided a gage 87 (see Fig. 4), this gage being adapted to engage the face 86 of the tool holder and having a downwardly projecting arm 88 adapted to engage the forward end 47 of the tool, the tool being moved into engagement with the arm 88 by means of the wedge 49 and the adjusting screw 50. It will thus be obvious that by the use of the gage 87 the forward or cutting edge of the tool 48 may be accurately set relative to the tool holder.

In addition to accurately determining the position of the forward end 47 of the tool it will be seen that it is also essential to accurately determine the position of the tool laterally and for this purpose I provide a gage 89 having suitable slots for engaging the underside of the tool and which is preferably mounted on a rod 90 carried in a recess 91 in the frame 10 of the machine (see Figs. 2 and 3). The rod 90 is provided with rack teeth 92 which are engaged by the actuating gear 93, this gear being rotated by means of a hand-wheel 94. The rod 90 preferably extends to the rearward end of the machine and is provided with a suitable indicating scale 95 by means of which the longitudinal position of the rod 90 may be determined by the registration of the lines of the scale 95 with a suitable index such as the rear edge 96 of the frame 10. As the tool holder has motion in a curved path which is the result of the longitudinal movement given by the ram and the transverse movement of the holder with respect to the ram given by the cam, it is clear that the tool holder has a different position transversely of the ram for every point in the stroke of the latter. Hence it is necessary to provide some means for always setting the ram at a fixed point when the gage 89 is used. For this purpose the ram 11 has a bracket 82 formed with a slot 83 adapted to receive an arm or dog 84 pivotally mounted on a bracket 85 on the frame 10 (see Fig. 1). The arm 84 is normally in the position shown but when it is desired to adjust the tool transversely of the ram the latter is moved to a position where the slot 83 is in alinement with the arm 84, then the latter is thrown over into the slot thus locking the ram to the frame of the machine. This establishes a definite position for the tool holder transversely of the machine, and longitudinally of its stroke. When the ram is thus locked, if the tool does not fit the slot in the gage 89, the holder and tool may be adjusted laterally by means of the bolts 30 until the tool drops into the said slot.

The gage 89 may also be provided with a slot 97 for setting the tool when it is desired to cut gears having straight teeth.

It is believed that the operation of the positioning means will be thoroughly understood from the foregoing description taken in connection with the drawings. It will also be understood that various changes may be made in the details of construction within the scope of my invention, as defined in the claims, and therefore I do not wish to be limited to the exact details of construction shown and described.

Having thus described my invention, what I claim and desire to secure by Letters Patent is:—

1. In a machine of the class described, in combination, a tool holder, a tool mounted thereon, means for reciprocating the tool in a curved path, means for adjusting the tool in the general direction of its reciprocation, and a gage for determining the setting of the cutting edge of the tool relative to the holder.

2. In a machine of the class described, means for setting the tool comprising a rod adjustable in the general direction of movement of the tool, and means carried by said rod for determining the position of the tool transversely of the machine.

3. In a machine of the class described, the combination of a frame, a ram slidably mounted on the frame, and means for locking the ram to the frame.

4. In a machine of the class described, the combination of a frame, a ram slidably mounted thereon, and means including a pivotally mounted arm on one part adapted to engage a slot in the other part for the purpose of locking the ram to the frame.

5. In a machine of the class described, the combination of a frame, a ram, a slotted bracket secured to the ram, an arm pivoted to the frame and adapted to engage the slot in said bracket for the purpose of locking the ram to the frame.

6. In a machine of the class described, means for setting the tool comprising an adjustable rod means carried by said rod for determining the position of the tool and scale means for determining the position of the rod.

7. In a machine of the class described, means for setting the tool comprising an adjustable rod, a slotted gage carried by said rod for determining the position of the tool and a scale on said rod for determining the position of the rod.

8. In a machine of the class described, means for setting the tool comprising an adjustable rod, a slotted gage carried at one end of said rod for determining the position of the tool, a scale at the other end of said rod for determining the position of the rod, rack teeth intermediate the ends of said rod and a pinion meshing with said rack teeth and reciprocating said rod.

9. In a machine of the class described, means for setting the tool comprising a rod adjustable in the general direction of movement of the tool, a slotted gage carried at one end of said rod for determining the position of the tool, a scale at the other end of said rod for determining the position of the rod, rack teeth intermediate the ends of said rod and a pinion meshing with said rack teeth and reciprocating said rod.

10. In a machine of the class described, the combination of a frame, a ram slidably mounted on the frame, a tool holder, means for adjusting the holder laterally relative to the path of the ram, means for locking the ram to the frame at one point of its stroke, and means for determining the position of the tool transversely of the machine.

11. In a machine of the class described, in combination, a reciprocating tool, means for adjusting the tool laterally of the machine, means for locking the tool against movement at one point of its stroke, and a gage for determining the position of the tool transversely of the machine.

In testimony whereof I affix my signature.

CHARLES E. DERR.